(12) United States Patent
Greene et al.

(10) Patent No.: US 7,673,865 B2
(45) Date of Patent: Mar. 9, 2010

(54) PRESENTATION INSTRUMENT DISTRIBUTION SYSTEMS AND METHODS

(75) Inventors: Jay Greene, Omaha, NE (US); Scott J. Smith, Fremont, NE (US); Jeff Nowlin, Council Bluffs, IA (US); Douglas S. Bailey, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 2194 days.

(21) Appl. No.: 10/313,474

(22) Filed: Dec. 6, 2002

(65) Prior Publication Data

US 2004/0111348 A1 Jun. 10, 2004

(51) Int. Cl.
*B65H 39/00* (2006.01)
(52) U.S. Cl. .............. 270/52.02; 270/52.03; 270/52.04; 270/52.05; 270/58.06
(58) Field of Classification Search .............. 270/52.02, 270/52.03, 52.04, 52.05, 58.06
See application file for complete search history.

(56) References Cited

U.S. PATENT DOCUMENTS

| | | | | | |
|---|---|---|---|---|---|
| 3,484,097 | A | * | 12/1969 | Jory | 270/52.13 |
| 3,704,015 | A | * | 11/1972 | Holovka et al. | 270/52.13 |
| 4,326,704 | A | * | 4/1982 | Barr | 270/52.13 |
| 4,384,196 | A | * | 5/1983 | McCumber et al. | 235/375 |
| 4,972,655 | A | * | 11/1990 | Ogawa | 53/155 |
| 5,896,725 | A | * | 4/1999 | Lundstrom et al. | 53/54 |
| 5,923,015 | A | * | 7/1999 | Hill et al. | 235/380 |

* cited by examiner

*Primary Examiner*—Gene Crawford
*Assistant Examiner*—Leslie A Nicholson, III
(74) *Attorney, Agent, or Firm*—Townsend and Townsend and Crew, LLP

(57) ABSTRACT

Systems and methods for preparing presentation instruments for distribution. Some of the methods include reading a code from a distribution stock, accessing a database and determining a presentation instrument to be associated with the distribution stock, selecting the presentation instrument, and associating the presentation instrument with the distribution stock. The various systems include hardware and/or software components for implementing the methods.

24 Claims, 7 Drawing Sheets

PRESENTATION INSTRUMENT DISTRIBUTION SYSTEMS AND METHODS

BACKGROUND OF THE INVENTION

The present invention relates generally to the field of mail processing machines and systems for using such, and in particular to systems and methods for preparing presentation instruments for delivery to end users.

Millions of credit cards and other presentation instruments are sent to end users each year. Processing such credit cards involves a number of steps that must be accomplished while adhering to rigid security standards. Such steps can include manufacturing the credit cards including application of names and card numbers to the credit card stock. These cards are then attached to mailing stock which is addressed to the end user of the card. It is necessary to assure that the mailing stock matches the card or cards attached thereto to assure that the correct end user receives the card. The mailing stock is then folded and sent to the end user.

Various processes are utilized that include attaching two sided tape, or some other form of adhesive to the credit card and then affixing the card to the mailing stock. However, this approach requires that the surface area of the mailing stock be at least as large as the area of the cards to be sent. This can be problematic in situations where the cards are for an entire group, and a single mailing stock is not large enough to handle all of the cards. This can result in costs of providing multiple mailings to a single group of end users, and/or confusion by such end users. This problem has become acute where credit card products are now being offered to groups of end users. As just some examples, such groups can be defined and developed in accordance with techniques disclosed in the following U.S. patent application Ser. No. 09/298,417, entitled "Method for Processing a Group of Accounts Corresponding to Different Products", filed Apr. 23, 1999; Ser. No. 09/298,505, entitled "Method for Linking Accounts Corresponding to Different Products Together to Create a Group, filed Apr. 23, 1999; Ser. No. 09/298,521, entitled "Method for Defining a Relationship Between an Account and a Group", filed Apr. 23, 1999; and Ser. No. 10/172,378, entitled "System and Methods for Accessing and Modifying Usage Parameters Associated with a Financial Transaction Account", filed Jun. 13, 2002; each of which is assigned to the assignee of the present invention. Further, each of the aforementioned applications are incorporated herein by reference for all purposes.

Further, credit cards have traditionally involved providing a credit card with a number that is associated with an account of the same number. For various reasons, credit cards are now being offered with numbers that are distinct from an account number to which the cards are associated. In part because of this, traditional methods of processing credit cards for distribution to end users have become outmoded. For example, traditional processing typically involves assuring that the number on the card matches the number on the stock to which the card was attached. Where the numbers do not match, an error results. Thus, in today's environment where many of the numbers intentionally do not match, the existing processing techniques are insufficient.

Various machines have been developed for processing credit cards for delivery to end users. One such machine is the DATACARD™ Series 2500 Inserter Machine. This machine provides a mechanism for receiving a credit card, moving the selected card to a particular insertion slot of a stock used to deliver the credit card, and inserting the card in the insertion slot. The stock is then folded and sent to the recipient of the card. Unfortunately, the machine does not provide a flexible mechanism for dealing with credit cards that are introduced in an order different from a pre-printed stock. Further, there is no mechanism for matching a credit card with an abstracted number provided on the pre-printed stock, nor for placing multiple credit cards, each with a distinct number, on a pre-printed stock including only a single number. Additionally, the machine does not include mechanisms for halting processing when some processing errors are detected. This can result in an operator having to sort through hundreds of processed credit cards to account for the error. Yet further, the machine does not provide a mechanism for inserting multiple credit cards into a single slot. Additionally, the machine includes a number of sensors and moving mechanical elements that are prone to failure. Such failures can result in down time and repair costs.

Hence, for at least the aforementioned reasons, there exists a need in the art for advanced systems and methods for preparing presentation instruments for delivery to end users.

BRIEF SUMMARY OF THE INVENTION

Among other things, the present invention provides systems and methods for preparing presentation instruments for distribution. Such presentation instruments can include, but are not limited to, credit cards, debit cards, check guarantee cards, identification cards, driver's licenses, membership cards, ATM cards, stored value cards, and the like. In various cases, one or more presentation instruments are attached to a distribution stock, which is then folded and prepared for mailing, or some other form of distribution. In some cases, the presentation instruments are inserted into slots formed on the distribution stock. Further, embodiments of the invention also provide for inserting multiple presentation instruments into a single slot. Inserting multiple presentation instruments into a single slot can reduce the amount of surface area of the distribution stock used to hold the presentation instruments. Additionally, in some embodiments, a presentation instrument processing system is provided that can insert presentation instruments into any presently available slot, regardless of the order that the various presentation instruments are received. Thus, for example, the first available presentation instrument may be directed to the second available slot, and the second available presentation instrument may be directed to the first available slot. This is advantageous as prior systems would generate an error if the presentation instruments were presented out of order. Further, in some embodiments, an ability to re-read a misread presentation instrument is also provided. This ability avoids various errors that are generated when presentation instruments are misread.

In various embodiments of the present invention, stepper motors are utilized that provide an encoded position feedback. Such an approach can reduce the number of sensors required to operate a presentation instrument distribution and/or processing system. The position feedback information from the stepper motors can be provided to a computer responsible for controlling the presentation instrument processing system. In certain cases, the feedback from the stepper motors is provided via a serial interface, which is converted to an Ethernet format prior to being transmitted to the controlling computer. Further, the stepper motors can include processing capability that allows the motor to oversee various functionality of a presentation instrument processing system. For example, in addition to providing movement of presentation instruments, the various stepper motors can also provide outputs to control switching of various solenoids associated with the presentation instrument processing system. In some embodiments, various of the motors include processing capability sufficient to control various functions of the presentation instrument processing system. In addition, processing capability provided on an interface board provides processing control where multiple motors are involved, and a controlling computer provides overall processing capability. This distributed processing approach makes efficient use of processing capabilities. In various embodiments, the motors can be individually fused, thus providing for simple identification and repair of a failed system.

Additionally, in some embodiments of the present invention, a controlling computer associated with a presentation instrument processing system provides database access capability. The accessed database can include information correlating various presentation instruments to specific distribution stock. Information from the database can thus be used to direct the association of the presentation instruments with the distribution stock. In some cases, a code provided on the distribution stock is distinct from the code provided on the presentation instrument to be associated with the distribution stock. Access to the database can be used to correlate the code from the presentation instrument with the code from the distribution stock. Additionally, two or more presentation instruments may be associated with the same distribution stock, and each of the distribution stock and the presentation instruments may include distinct codes. Again, access to the database can be used to correlate the distinct codes, thus matching the various presentation instruments with the desired distribution stock.

In various instances, accessing the database and determining a presentation instrument to be associated with a distribution stock includes providing the code associated with the distribution stock, and receiving a code associated with the presentation instrument to be associated with the distribution stock. In cases where the distribution stock is one of a plurality of distribution stock, accessing the database and determining a presentation instrument to be associated with the distribution stock can include providing the code associated with at least one of the distribution stock, and receiving a series of codes associated with a plurality of presentation instruments to be associated with the plurality of distribution stock. In such a case, preparing the plurality of presentation instruments for distribution can be accomplished with a single access to the database. In such cases, the order of the plurality of distribution stock can be maintained in the database, and the plurality of presentation instruments is ordered to match the order of the plurality of distribution stock.

In particular instances, multiple presentation instruments are associated with at least two of the plurality of distribution stock simultaneously, and the codes associated with the presentation instruments to be associated with the distribution stock can be received in any order. Further, feedback from the presentation instrument processing system can be used to determine where an error in processing has occurred, and that information can be flagged in the database. Additionally, the presentation instrument processing system can provide processing feedback to the database that is used to assure that proper processing has been completed. Thus, for example, if a presentation instrument becomes lost, access to the database can be used to determine whether the loss occurred before passing through the presentation instrument processing system, or thereafter.

One particular embodiment of the present invention provides a method for preparing presentation instruments for distribution. The method includes reading a code from a distribution stock. Based at least in part on the code, a database is accessed and one or more presentation instruments to be associated with the distribution stock are identified. One or more identified presentation instruments are then selected and associated with the distribution stock.

In some instances, a second presentation instrument is also identified, selected, and associated with the distribution stock. Further, in some cases, a code associated with the first presentation instrument is distinct from a code associated with the second presentation instrument. Both presentation instruments can be inserted into the same slot on a distribution stock, or into different slots. Inserting both into the same slot can include moving both the first and the second presentation instruments to the same holding port, bending the presentation instruments in the holding port, placing the bent presentation instruments into contact with the distribution stock, and unbending the presentation instruments such that a portion of the first presentation instrument and a portion of the second presentation instrument are within the slot on the distribution stock. Alternatively, inserting the presentation instruments into different slots can include moving the first presentation instrument to a first holding port and the second presentation instrument to a second holding port. Both the presentation instruments are bent in their respective holding ports, placed in contact with the distribution stock, and unbent such that a portion of the first presentation instrument is within a first slot and a portion of the second presentation instrument is within a second slot. As yet another alternative, other methods can be used to attach the presentation instruments to the distribution stock including, for example, attaching the presentation instruments using adhesive.

In various instances, the embodiment further includes folding the distribution stock into a letter sized form. In some cases, this involves folding the distribution stock into three equal parts with the part holding the presentation instruments sandwiched between the two other parts.

In some instances of the embodiment, selecting the presentation instrument includes pulling the presentation instrument from a holding bin, moving the presentation instrument to a reader, and reading a code associated with the presentation instrument. Yet further, some instances include receiving a misread indication, moving the presentation instrument to the reader, and re-reading the code associated with the presentation instrument.

In various instances, multiple distribution stock are available for population simultaneously. In such embodiments, a first presentation instrument can be attached to one of the multiple distribution stock, followed by attaching a second presentation instruments to one of the other distribution stock. In some cases, two or more presentation instruments are moved to an inserter head, and then simultaneously attached to the multiple distribution stock.

Other embodiments of the present invention provide methods for assembling presentation instruments for distribution that include reading a first code from a distribution stock and a second code from a presentation instrument, the first and the second codes being distinct. Thus, for example, the first code may be a financial account number associated with an end user, and the second code may be a credit card number associated with the end user. The credit card number may be a key for accessing the financial account, while being a different and distinct number from the financial account number. Based at least in part on the first and second codes, it is determined that the presentation instrument is associated with the distribution stock. The presentation instrument is then attached to the distribution stock. As with the previous embodiments, a database can be accessed to correlate the presentation instrument with the distribution stock. In some instances, the method also includes re-reading the code on either or both of the distribution stock and the presentation instrument where a misread occurs. In some cases, it may also be determined that a presentation instrument that is read does not match one or more distribution stock aligned to be populated by presentation instruments (i.e., the available distribution stock). In such cases, an error state can be indicated and processing halted until the error condition is addressed. Once populated with presentation instruments, the distribution stock can be folded for mailing, and blown into a stackable orientation.

In yet other embodiments, a method for preparing presentation instruments for distribution is provided that includes loading a list from a server to a presentation instrument processing system. The list correlates a plurality of presentation instruments with a plurality of distribution stock. The plurality of distribution stock and the plurality of presentation instruments are loaded into the presentation instrument system. One of the plurality of presentation instruments is moved to a presentation instrument reader and read. Reading the presentation instrument can include reading a code marked on the presentation instrument. The list is accessed and it is determined that the read presentation instrument is associated with one of the plurality of distribution stock. The presentation instrument is then moved into proximity with the distribution stock, bent, placed in contact with the distribution stock, and unbent such that at least a portion of the presentation instrument is disposed within a slot on the distribution stock.

In some instances, the method further includes reading a code marked on the distribution stock. This code can either be the same as, or distinct from the code on the presentation instrument. From the list, it is determined whether the presentation instrument is to be associated with the distribution stock. In some cases, the code marked on the distribution stock is an account number associated with an end user, and the code marked on the presentation instrument is a credit card number that is distinct from the account number, but associated with the account number. In particular cases, the code marked on the distribution stock is a bar code, and the code marked on the presentation instrument is a raised alphanumeric code.

Yet further embodiments provide systems for processing presentation instruments. Such systems include a means for reading a code from a distribution stock, a means for accepting the code from the distribution stock, accessing a database, and determining a presentation instrument to be associated with the distribution stock, a means for selecting the presentation instrument, and a means for associating the presentation instrument with the distribution stock. In some cases, the distribution stock includes a slot, and the means for associating the presentation instrument with the distribution stock includes a system for inserting the presentation instrument into the slot. Such an insertion system can include a bending element that includes a holding element in contact with an outer portion of the presentation instrument and deforming element in contact with a central portion of the presentation instrument. The holding and deforming elements move relative to each other thereby bending the presentation instrument. The insertion system can further include a moving element that is in contact with the presentation instrument and is capable of moving the presentation instrument into contact with the distribution stock.

In some cases, the system for processing presentation instruments further includes a folding element for folding the distribution stock, and a blower for orienting the distribution stock into a stackable orientation. Yet further, some of the systems further include a roller for advancing the distribution stock to the folding element, a picker mechanism for obtaining the presentation instrument, and/or a reader for reading a code marked on the presentation instrument.

Additional embodiments of the present invention provide systems for processing presentation instruments that include a presentation instrument reader, a distribution stock reader, and a controlling computer coupled to the presentation instrument reader and the distribution stock reader via an interface system. The controlling computer is associated with a computer readable medium that comprises instructions executable by the controlling computer to: receive a first code from the distribution stock reader that identifies a distribution stock, receive a second code from the presentation instrument reader that identifies a presentation instrument, access data correlating a plurality of distribution stock with a plurality of presentation instruments, and determine that the presentation instrument is to be associated with the distribution stock.

Other embodiments of the present invention provide systems for processing presentation instruments that include a presentation instrument reservoir, a presentation instrument reader, a first motor system for moving a presentation instrument from the presentation instrument reservoir to the presentation instrument reader, a distribution stock holder, distribution stock reader, a second motor system for moving a distribution stock toward the distribution stock reader, and an interface controller electrically coupled via a serial interface to the first and the second motor systems and electrically coupled to a controlling computer via an Ethernet interface. In some instances, the first and the second motor systems comprise at least one motor with a encoded position output. In various instances, the system for processing presentation instruments further includes a plurality of insertion reservoirs, and a third motor system for moving the presentation instrument into one of the plurality of insertion reservoirs. In particular cases, the third motor system is electrically coupled via a serial interface to the interface controller. In some cases, a fourth motor system is also included for deforming the presentation instrument in the insertion reservoir or holder. The systems can further include a fifth motor system for applying the plurality of presentation instrument reservoirs to the distribution stock, a sixth motor system for advancing the distribution stock through a folder, and/or a blower coupled to the folder, wherein the blower causes the distribution stock to be oriented in a stackable position. In some cases, the various motor systems are individually fused.

The systems can further include various commands. For example, the systems can include an insertion command provided from the controlling computer to the third motor system that indicates which of the plurality of insertion reservoirs to direct a presentation instrument. Additionally, the systems can include an insertion reservoir full command provided from the interface controller, a deformation command provided to the fourth motor system that causes the fourth motor system to deform the presentation instrument in the one of the plurality of insertion reservoirs. Other commands can include an insertion command that causes the fourth motor system to release the presentation instrument from a deformed orientation, and an application command that causes the fifth motor system to move the plurality of presentation instruments into contact with the distribution stock.

Yet further embodiments of the invention provide interface systems. Such interface systems include a plurality of serial ports and at least one Ethernet port. A processor and a computer readable medium are also provided. The computer readable medium comprises instructions executable by the processor to: convert an input from one of the plurality of serial ports to an Ethernet output, and convert an input from the at least one Ethernet port to a serial output. In some cases, the interface systems further include a stepper motor coupled to one of the plurality of serial ports, and a process control computer coupled to the Ethernet port. Various embodiments further include instructions to combine data receive from two of the plurality of serial ports and convert the combined data into an Ethernet output, combine data received from two of the plurality of serial ports, and to convert the combined data into an Ethernet output, and/or parse data received via the Ethernet port and distribute the parsed data via one or more of the serial ports.

This summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
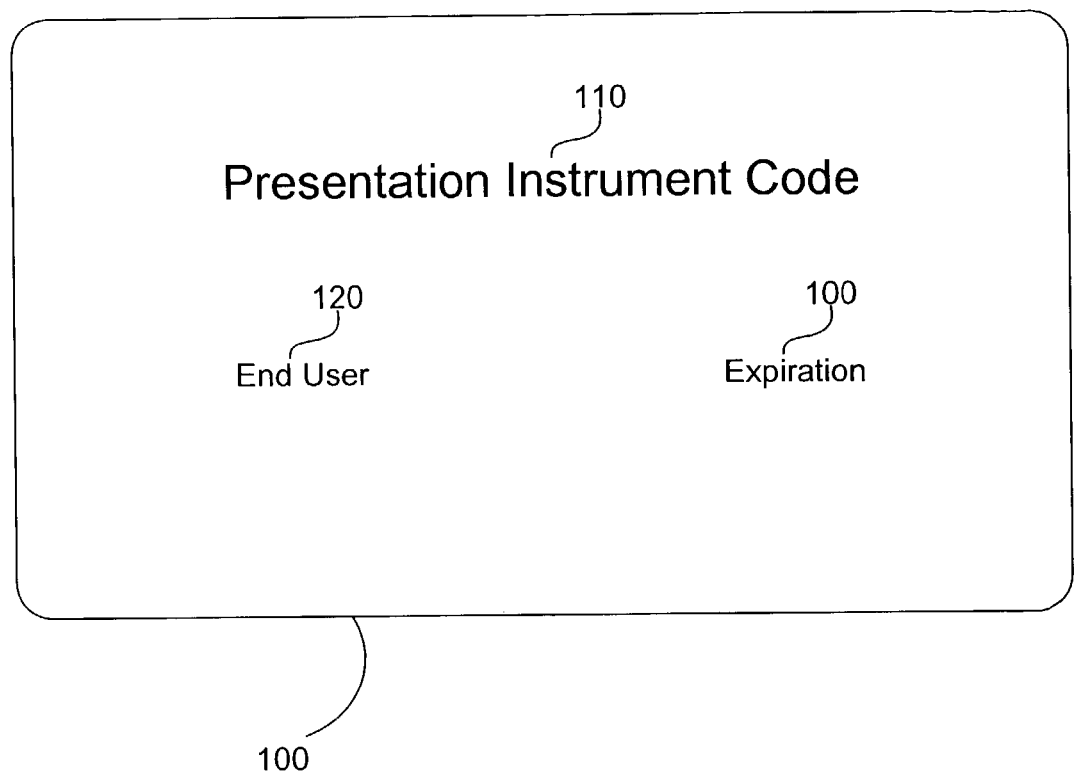
FIG. 1 illustrates an exemplary presentation instrument processed in relation to the systems and methods of the present invention.

Among other things, the present invention provides systems and methods for preparing presentation instruments for distribution. Such presentation instruments can include, but are not limited to, credit cards, debit cards, check guarantee cards, identification cards, driver's licenses, membership cards, ATM cards, calling cards, stored value cards, library cards, and the like. In some cases, one or more presentation instruments are attached to a distribution stock, which is then folded and prepared for mailing, or some other form of distribution. For the purposes of this document, distribution stock can be any media associable with one or more presentation instruments. For example, distribution stock can be a pre-printed document that includes an area for attaching one or more presentation instruments. In some cases, the distribution stock includes slots for inserting the presentation instrument(s).

In one operation of the systems in accordance with the present invention, a presentation instrument is picked from a reservoir of presentation instruments, matched to a specific distribution stock, and inserted into a set of slots formed in the distribution stock. In various embodiments, multiple presentation instruments can be inserted in a single set of slots, thus minimizing the surface area of the distribution stock required to hold the presentation instruments. In some cases, the presentation instruments are pulled from the reservoir in the order of the slots available in the distribution stock. Alternatively, in other embodiments, the presentation instruments are pulled from the reservoir out of order from the available slots. In such cases, the presentation instruments are directed to the correct slots, whether the slot be the next available slot, or any other available slot. For the purposes of this document, an available slot is any area of distribution stock currently presented for accepting one or more presentation instruments. Thus, systems in accordance with embodiments of the present invention provide capability for receiving mis-ordered presentation instruments, so far as the group of presentation instruments pulled from the reservoir match at least one available slot.

In various embodiments of the present invention, stepper motors are utilized that provide an encoded position feedback. Such an approach can reduce the number of sensors required to operate a presentation instrument processing system. The position feedback information from the stepper motors can be provided to a computer responsible for controlling the presentation instrument distribution system. In certain cases, the feedback from the stepper motors is provided via a serial interface, which is converted to an Ethernet format prior to being transmitted to the controlling computer. Further, the stepper motors can include processing capability that allows the motor to oversee various functionality of a presentation processing system. For example, in addition to providing movement of presentation instruments, the various stepper motors can also provide outputs to control switching of various solenoids associated with the presentation instrument processing system. Further, in some embodiments, various of the motors include processing power sufficient to control various functions of the presentation instrument processing system. In addition, processing capability provided on the an interface board provides processing control where multiple motors are involved, and a controlling computer provides overall processing capability. In various embodiments, the motors can be individually fused providing for simple identification and repair of a failed system.

Additionally, in some embodiments of the present invention, a controlling computer associated with a presentation instrument processing system provides for access to a database. The database comprises information correlating various presentation instruments to specific distribution stock. Information from the database can thus be used to direct the association of the presentation instruments with the distribution stock. In some cases, the code provided on the distribution stock is distinct from the code provided on the presentation instrument to be associated with the distribution stock. Access to the database can be used to correlate the presentation instrument with the distribution stock based at least in part on the distinct codes. Additionally, two or more presentation instruments may be associated with the same distribution stock and each of the distribution stock and the presentation instruments may include distinct codes. Again, access to the database can be used to correlate the distinct codes, thus matching the various presentation instruments with the desired distribution stock.

In various instances, accessing the database and determining a presentation instrument to be associated with the distribution stock includes providing the code associated with the distribution stock, and receiving a code associated with the presentation instrument to be associated with the distribution stock. In cases where the distribution stock is one of a plurality of distribution stock, accessing the database and determining a presentation instrument to be associated with the distribution stock can include providing the code associated with at least one of the distribution stock, and receiving a series of codes associated with a plurality of presentation instruments to be associated with the plurality of distribution stock. In such a case, preparing the plurality of presentation instruments for distribution can be accomplished with a single access to the database. In such cases, the order of the plurality of distribution stock can be maintained in the database, and the series of codes associated with the plurality of presentation instruments is ordered to match the order of the plurality of distribution stock. In particular instances, presentation instruments are associated with at least two of the plurality of distribution stock simultaneously, and the codes associated with the presentation instruments to be associated with the at least two of the plurality of distribution stock can be received in any order.

Further, feedback from the presentation instrument processing system can be used to determine where an error in processing has occurred, and that information can be flagged in the database. Additionally, the presentation instrument processing system can provide processing feedback to the database that is used to assure that proper processing has been completed. Thus, for example, if a presentation instrument becomes lost, access to the database can be used to determine whether the loss occurred before passing through the presentation instrument processing system, or thereafter.

Referring to FIG. 1, an exemplary presentation instrument 100 processed in relation to the systems and methods of the present invention is illustrated. As illustrated, presentation instrument 100 includes a presentation instrument code 110, the name of an end user 120, and an expiration date 130. In some cases, the information provided in fields 110, 120, 130 is embossed, while in other cases, the information is printed or otherwise formed flush with the surface of presentation instrument 100. Presentation instrument code 110 can be any code that identifies the presentation instrument and/or the user thereof. Thus, for example, presentation instrument code 110 can be a credit card number that is the same as an underlying financial account number, or distinct from the underlying account number, but that can be correlated to the credit account number. Further, presentation instrument code 110 can be any format including, but not limited to, alpha-numeric sequences, a bar code, a symbolic representation, or the like. Presentation instrument 100 can be made of plastic, or other suitable material. Presentation instrument 100 is merely exemplary, and based on the disclosure provided herein one of ordinary skill in the art will recognize many other types of presentation instruments that can be processed in accordance with the systems and methods of the present invention.

Figure 2:
FIG. 2 illustrates an exemplary distribution stock in accordance with various embodiments of the present invention.

Turning to FIG. 2, a distribution stock 200 is illustrated. As illustrated, distribution stock 200 includes a number of individual distribution stock 210a, 210b, 210c, 211a, 211b, 211c. Each of the individual distribution stock 210a, 210b, 210c, 211a, 211b, 211c are separated by perforations 215, 220, 225. In some cases, distribution stock 200 is provided in a roll, or a folded set with hundreds or more individual distribution stock attached via perforations. It should be recognized that distribution stock of a single width and/or a single length are possible in accordance with the present invention. Additionally, distribution stock of widths greater than two are also possible in accordance with the present invention.

Referring to distribution stock 211b, an address area 230a can be provided. Within address area 230a, a mailing address and a name of an end user 232a can be provided. In addition, a distribution stock code 234a is provided. Distribution stock code 234a identifies the associated distribution stock. Distribution stock code 234a can thus be used to identify the distribution stock and correlate the distribution stock with one or more presentation instruments associated therewith. Further, in some cases, distribution code 234a is an account number of the end user identified in field 232a. As another example, distribution stock code 234a is a social security number of the end user, or a hash of the end user's name and address information. As yet another alternative, distribution stock code 234a is a random number or code that is maintained in a database and correlated to the end user, or the end user's account. Based on the disclosure provided herein, one of ordinary skill in the art will recognize a myriad of other codes, identification mechanisms, and/or methods of representing such that can be used in accordance with the present invention. For example, while distribution code 234a is illustrated as a bar code, it could also be represented as an alpha-numeric code or some other representation.

In addition, distribution stock 211b includes a presentation instrument attachment area 240a. As illustrated, attachment area 240a includes two areas 242a, 244a, to attach presentation instruments. It should be noted that one or more than two areas 242a, 244a can be used in accordance with the present invention. Also, as illustrated, areas 242a, 244a include slots under which the corners of presentation instruments are inserted and thereby maintained in a fixed position. Alternative embodiments can include areas where presentation instruments are adhered to distribution stock 211b using some kind of adhesive material, such as, for example, two sided tape. In one particular embodiment of the present invention, the D-Type slots as illustrated are used to allow insertion of multiple presentation instruments into the same set of slots. Of course, based on the disclosure provided herein, one of ordinary skill in the art will recognize a number of other methods for attaching presentation instruments to distribution stock 211b. Further, one of ordinary skill in the art will recognize that more or less surface area than that illustrated as attachment area 240a can be utilized.

Further, distribution stock 211b can include a promotional area 250a. Promotional area 250 can include promotional advertisements 252a, or other message information. In some cases, the message information can be tailored for the end user noted in field 232a. Thus, for example, it can be noted that the end user has attained a certain level of reward points associated with one or more of the attached presentation instruments and the end user can be notified of such. Alternatively, the terms associated with the presentation instruments can be displayed. Based on the disclosure provided herein, one of ordinary skill in the art will recognize a number of other messages and/or message types that can be displayed in promotional area 250a. Alternatively, promotional area 250 can be eliminated, or replaced with more area for holding additional presentation instruments.

As should be noticed, distribution stock 210b is similar and includes similar elements 230, 232, 234, 240, 242, 244, 250, 252 to those previously described in relation to distribution stock 211b. However, it should be recognized that distribution stock 210b and distribution stock 211b are not necessarily identical. For example, it is common that the two distribution stock are uniquely identified by using distinct distribution stock codes 234, and are addressed to distinct end user's identified in fields 232. Further, different promotional advertisements can be used on each of the distribution stocks 211b, 210b. As such, the promotional advertisements can be tailored for the user identified in field 232.

Figure 3:
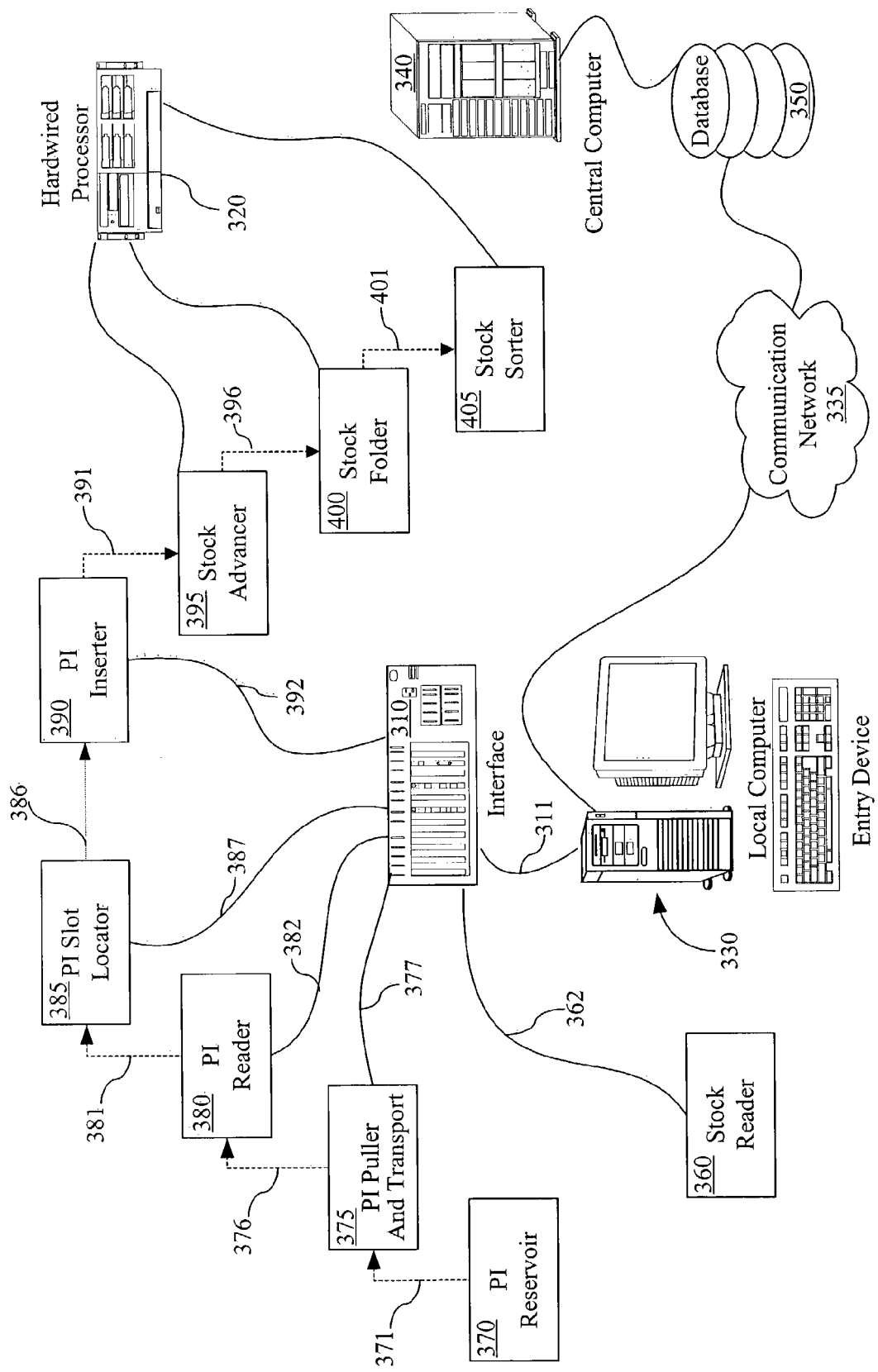
FIG. 3 is a functional diagram of a presentation instrument processing system in accordance with embodiments of the present invention.

Referring to FIG. 3, various functional blocks of one embodiment of a presentation instrument processing system 300 in accordance with the present invention are described. As illustrated, presentation instrument processing system 300 includes a presentation instrument reservoir 370, a presentation instrument puller and transport 375 attached to presentation instrument reservoir 370 via a processing path 371. Further, a presentation instrument reader 380 is provided and attached to presentation instrument puller and transport 375 via a processing path 376. A presentation slot locator 385 is provided and attached to presentation instrument reader by a processing path 381. In addition, a presentation instrument inserter 390 is attached to presentation instrument slot locator 385 via a processing path 386. A stock advancer 395 moves stock into position proximate to presentation instrument inserter 390 along a processing path 391. Further, a stock folder 400 receives stock from stock advancer 395 along processing path 396, and a stock sorter 405 receives folded stock from stock folder 400 along a processing path 401.

Presentation instrument processing system 300 further includes a stock reader 360. In some embodiments, stock reader 360 is a bar code reader as known in the art. In addition, an interface and processing circuit 310 is electrically coupled to stock reader 360 via a serial interface 362, to presentation instrument puller and transport 375 via a serial interface 377, to presentation instrument reader 380 via a serial interface 382, to presentation slot locator 385 via serial interface 387, and to presentation instrument inserter via serial interface 392. Interface and processing circuit 310 is also electrically coupled to a local computer 330 via an Ethernet interface 311. Local computer 330 can access a database 350 via a communication network 335. In some cases, local computer 330 is a personal computer, but can be any other computer capable of controlling the processes as described herein. A central computer 340 updates various information maintained in database 350. In one particular embodiment, central computer 340 is an IBM™ AS400 computer, but can be any computer capable of updating database 350. A hardwired processor 320 is electrically coupled to stock advancer 395, stock folder 400, and stock folder 405. In one particular embodiment, hardwired processor 320 is similar to that provided on DATACARD™ series 2500 machines.

In operation, one or more presentation instruments are loaded into presentation instrument reservoir 370. In some embodiments, the loaded presentation instruments are printed or embossed with various information identifying accounts and end users. In addition, distribution stock related to the loaded presentation instruments is loaded. The code(s) from the first distribution stock(s) are read by stock reader 360 and the codes are uploaded to local computer 330 via interface and processing circuit 310. In some embodiments, local computer 330 uses one or more of the codes from the distribution stock to access database 350 and obtain a list correlating the various presentation instruments with the various distribution stock. This list is then used by local computer 330 to assure that the proper presentation instrument is associated with a particular distribution stock during processing. Table 1 below provides an exemplary embodiment of a list obtained from database 350 correlating various presentation instruments with various distribution stock.

TABLE 1

Correlation List

| Distribution Stock Code | Distribution Stock Attachment Area | Corresponding Presentation Instrument Code(s) |
|---|---|---|
| 100000 | 1 | 56789234ADE |
|  | 2 |  |
| 100001 | 1 | 8778923DSAF |
|  |  | 599889234AE |
|  | 2 | 14589234FGJ |
| 100002 | 1 | JKDSF09999 |
|  | 2 |  |
| 100003 | 1 | FDLJ7987778888 |
|  | 2 | DF435454KFJG |
| 100004 | 1 | KL987987KLADSF |
|  | 2 |  |
| 100005 | 1 | 98437574357HDHF |
|  | 2 |  |
| 100006 | 1 | FHJKHDSJK888 |
|  | 2 | DSFJ8877 |
| 100007 | 1 | 984765KLJFLJ |
|  | 2 | HDSFJK666666 |
| 100008 | 1 | 7454095KDJFDS |
|  | 2 | FDSAG65545454 |

With processing thus initiated, presentation instrument puller and transport 375 pull a presentation instrument from presentation instrument reservoir 370 and transports the presentation instrument to presentation instrument reader 380. The presentation instrument is pulled and transported based on a command received from interface and processing circuit 310 by a stepper motor included as part of presentation instrument puller and transport 375. In some embodiments, presentation instrument puller and transport 375 includes a solenoid assembly that, when actuated, attaches to the presentation instrument, places the presentation instrument on a conveyor system, and moves the presentation instrument along the conveyor system to presentation instrument reader 380. One or more sensors, or an encoded output form the stepper motor included in presentation instrument puller and transport 375 indicate the location of the presentation instrument as it is passed to presentation instrument reader 380.

In some embodiments, presentation instrument puller and transport 375 provides an update of the location of the pulled presentation instrument to local computer 330 via interface and processing circuit 310. Once the presentation instrument is moved to presentation instrument reader 380, it is read. Reading the presentation instrument can be done using an optical character reader, a bar code reader, or the like. The code read from the presentation reader is communicated to local computer 330 via interface and processing board 310. This code is used to identify which distribution stock the presentation instrument is to be attached. The presentation instrument is correlated to the correct distribution stock, or in some cases an error code is generated and processing is halted. In some cases, where the presentation instrument is misread, it can be returned to presentation instrument reader 380 and re-read, while in other cases a misread results in an error that is reported to local computer 330 via interface and processing circuit 310.

Where the presentation instrument is properly read, the list correlating presentation instruments with distribution stock is accessed by local computer 330 and it is determined which distribution stock, and attachment area thereon to attach the presentation instrument. Where the distribution stock is available, presentation slot locator 385 moves the presentation instrument into the proper insertion holders disposed over the available distribution stock. In some embodiments, presentation instrument slot locator 385 includes four insertion holders that correspond to the four insertion areas 242, 244 of distribution stock 200 as previously described in relation to FIG. 2. This process of pulling, reading and moving presentation instruments to the proper insertion slot can be repeated until all presentation instruments associated with the available distribution stock are loaded into the proper insertion holder(s).

With the presentation instruments loaded in the proper insertion holders, a command from local computer 330 causes presentation instrument inserter 390 to attach the loaded presentation instruments to the available distribution stock. This can include inserting the presentation instruments into slots on the available distribution stock, or in some cases, using an adhesive to attach the presentation instruments to the surface of the distribution stock. In particular embodiments, the mechanical hardware related to presentation instrument inserter 390 is similar to that used on DATACARD™ series 2500 machines.

With the presentation instruments attached to the available distribution stock, the distribution stock is advanced by stock advancer 395, and the populated distribution stock folded by stock folder 400 much as that performed on DATACARD™ series 2500 machines. The folded distribution stock is then ejected and blown into a stackable orientation and sorted into a mailing reservoir by stock sorter 405. Each of the aforementioned operations can be done primarily under the direction of hardwired processor 320.

Figure 4:
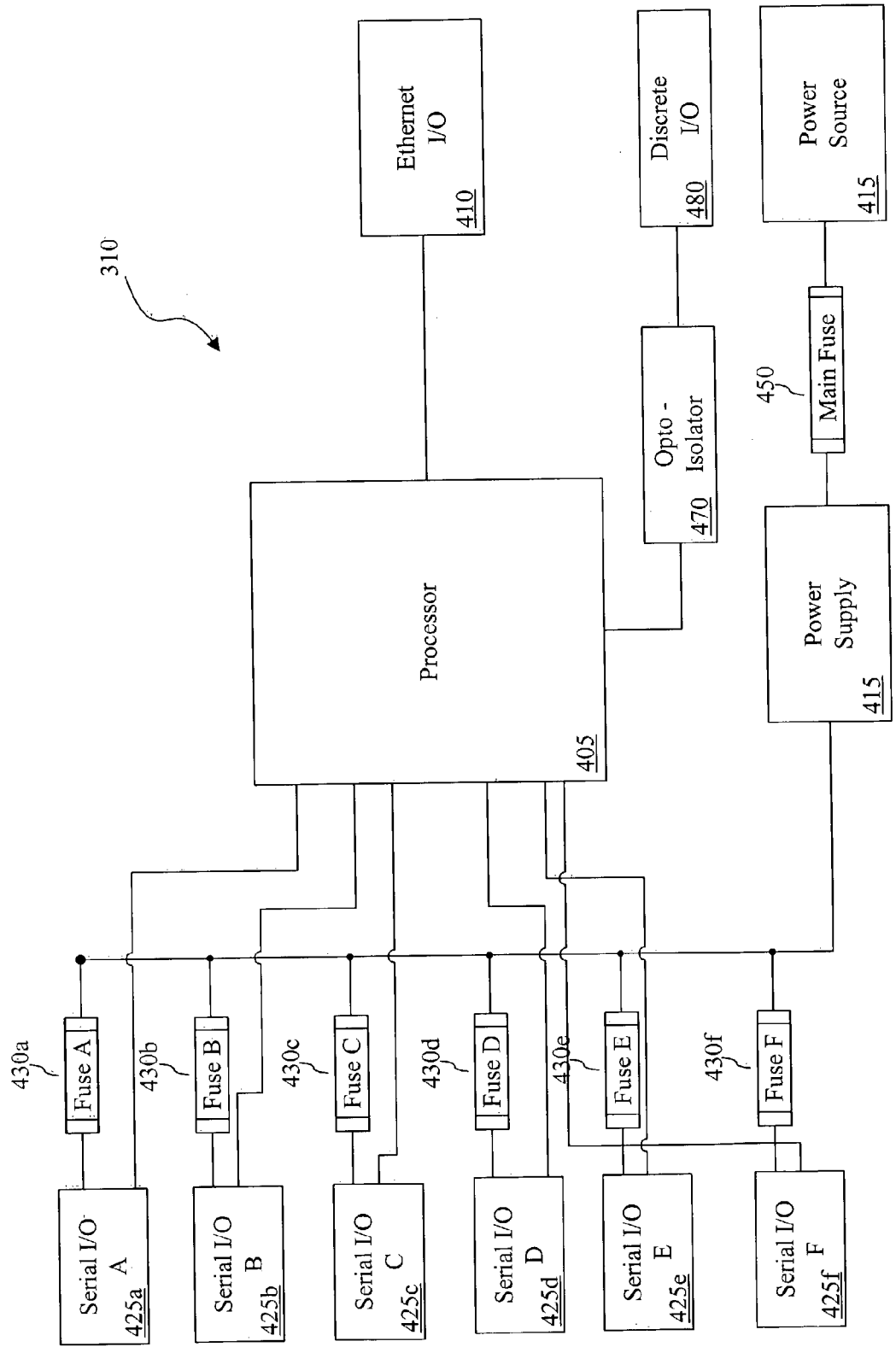
FIG. 4 is a schematic diagram of an interface circuit in accordance with embodiments of the present invention.

Referring to FIG. 4, a schematic diagram of one embodiment of interface and processor circuit 310 is illustrated. Interface and processor circuit 310 includes six serial I/O ports 425 each associated with an individually fused power source 430. The individually fused power sources 430 are supplied by a power supply 415 that is attached to a power source 460 via a main fuse 450. In this embodiment, power source 460 is an alternating current source.

Serial I/O ports 425 each include a data and clock signal for transferring data to and from a processor 405. Processor 405 is further coupled to an Ethernet port 410. In some embodiments, Ethernet port 410 is driven directly by processor 405. For example, in one such embodiment, processor 405 is a ZWORLD™ RCM 3000 processor with Ethernet capability. Further, in some embodiments, serial I/O ports 425 are driven by MAX3232C integrated circuits available from Texas Instruments, Inc. Further, in some embodiments, processor 405 is attached to a number of discrete I/O 480 via opto-isolators 470. For example, a PS2801-4 opto-isolator by NEC Corp. can be used.

Processor 405 can receive serial communications from any or all of serial I/O ports 425. Such serial communications can be converted to an Ethernet output that is provided on Ethernet port 410. In some cases, the serial input from two or more of serial ports 425 are combined and output on Ethernet port 410 as a single communication. In other embodiments, serial input from one serial I/O port 425 is output as an Ethernet communication separate from that received on another of the serial I/O ports. Yet further, in some embodiments, processor 405 services various inputs and outputs to one or more of the serial I/O ports based on commands, data, and/or queries received from another of the serial I/O ports 425. In this way various processing associated with the presentation instrument processing systems can be handled without communication with a controlling computer over an Ethernet link.

Further, processor 405 can receive communications via Ethernet port 410 and output portions of the communications to one or more of the serial I/O ports 425. In some cases, various Ethernet communications are first processed prior to being distributed on the one or more serial I/O ports. For example, this processing can be simply parsing the various Ethernet communication for distribution to the desired serial I/O port 425, while in other cases, processor 405 can be involved in more substantive processing activity.

Figure 5:
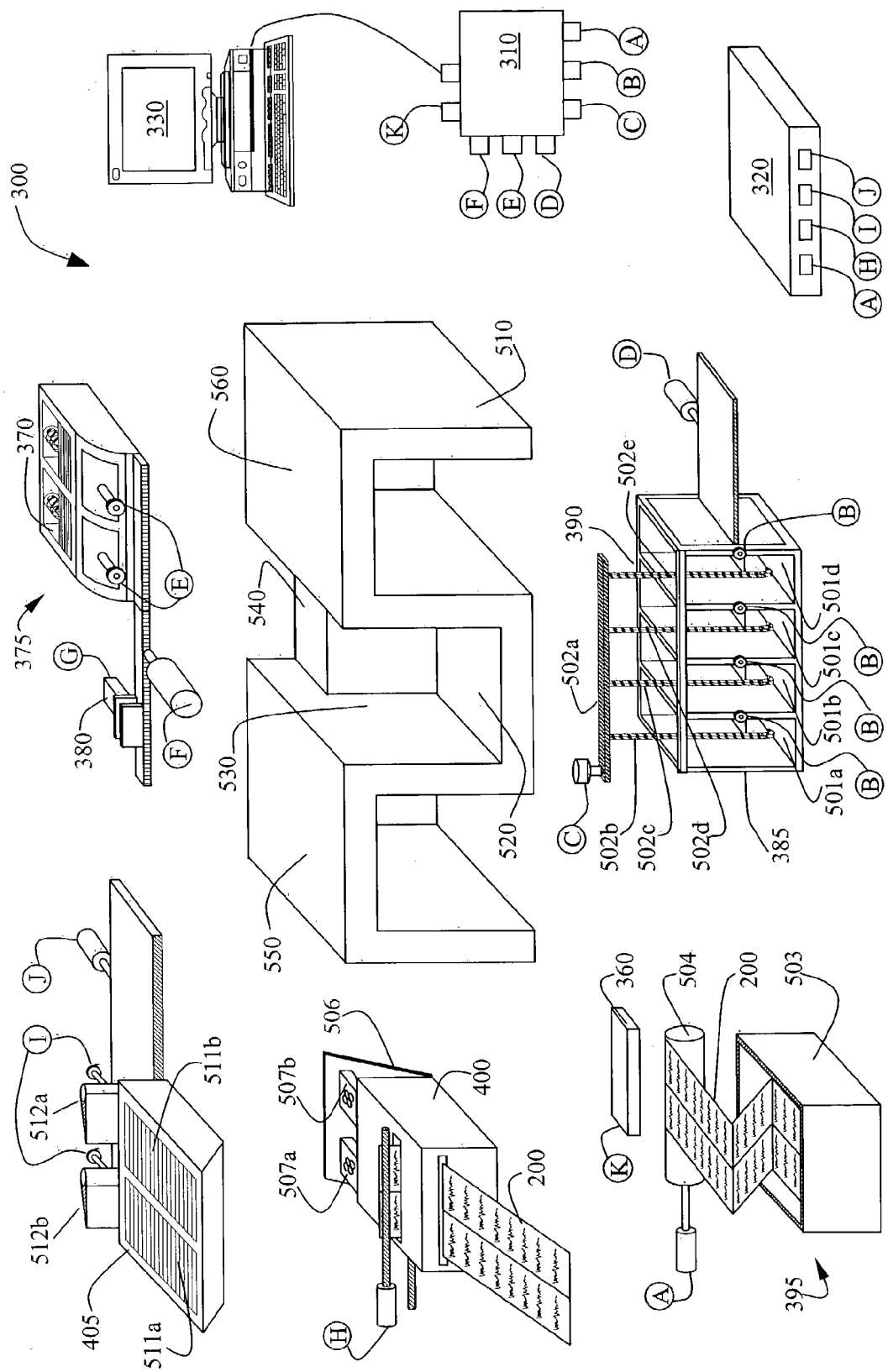
FIG. 5 is a mechanical diagram of the presentation instrument processing system of FIG. 3.

Referring to FIG. 5, a mechanical diagram of presentation instrument processing system 300 is provided. The mechanical diagram is in exploded form allowing each of the components to be illustrated. In addition, a central mounting table 510 is illustrated along with locations 520, 530, 540, 550, 550 thereon where the various components are placed. Some mechanical features of presentation system 300 are similar to the DATACARD™ series 2500 machines. Although a number of novel differences are noted on the sorter, the mechanics of the process control boards, and the motors and sensors. As illustrated, presentation instrument reservoir 370, presentation instrument puller and transport 375, and presentation instrument reader 380 are attached via a conveyor system and located at location 560 on central mounting table 510. A stepper motor F and solenoids E are associated therewith for pulling presentation instruments from presentation instrument reservoir 370 and moving the presentation instruments to presentation instrument reader 380.

Presentation instrument slot locator 385 and presentation instrument inserter 390 is located at location 530 on central mounting table 510. A stepper motor D moves the various presentation instruments into presentation instrument slot locator 385, and one of a series of solenoids B are activated to direct the presentation instrument into one of the four presentation instrument holders 501. Another stepper motor C controls movement of the mechanical insertion elements 502. Mechanical insertion elements are similar to those in the DATACARD™ series 2500 machines. Stock advancer 395 and associated stock reservoir 503 and roller 504, as well as stock reader 360 is located at location 520 on central mounting table 510. A motor A advances distribution stock 200 along roller 504 and past stock reader 360.

Stock folder 400 receives distribution stock 200 from stock advancer 395. Stock folder 400 is located at location 540 on central mounting table 510. Stock folder 400 is similar to that in the DATACARD™ series 2500 machines. A motor H controls movement of stock folder 400. Distinct from the series 2500 machines, blowers 507 and alignment element 506 attached to stock folder 400 is used to move the folded stock into a stackable orientation. As the folded distribution stock 200 exits stock folder 400, the leading edge contacts alignment element 506, and blowers 507 blow the trailing edge down, such that the trailing edge is oriented toward the bottom of alignment element 506, and the leading edge is oriented toward the upper edge of alignment element 506.

Stock sorter 405 is located at location 550 on central mounting table 510. The folded distribution stock 200 is rejected and blown into a stackable orientation. From there, the folded distribution stock 200 is advanced by a motor J along a conveyor system to one or more sorter elements 512 controlled by solenoids I. The solenoids control levers that flip toward two or more mailing reservoirs 511. In the flipped position, the levers direct folded distribution stock 200 into a desired mailing reservoir 511.

Local computer 330 can also be mounted on central mounting table 510 at any location easily accessed by an operator. Further, interface processor 310 and hardwired processor can be located at a convenient location on central mounting table 510.

Figure 6:
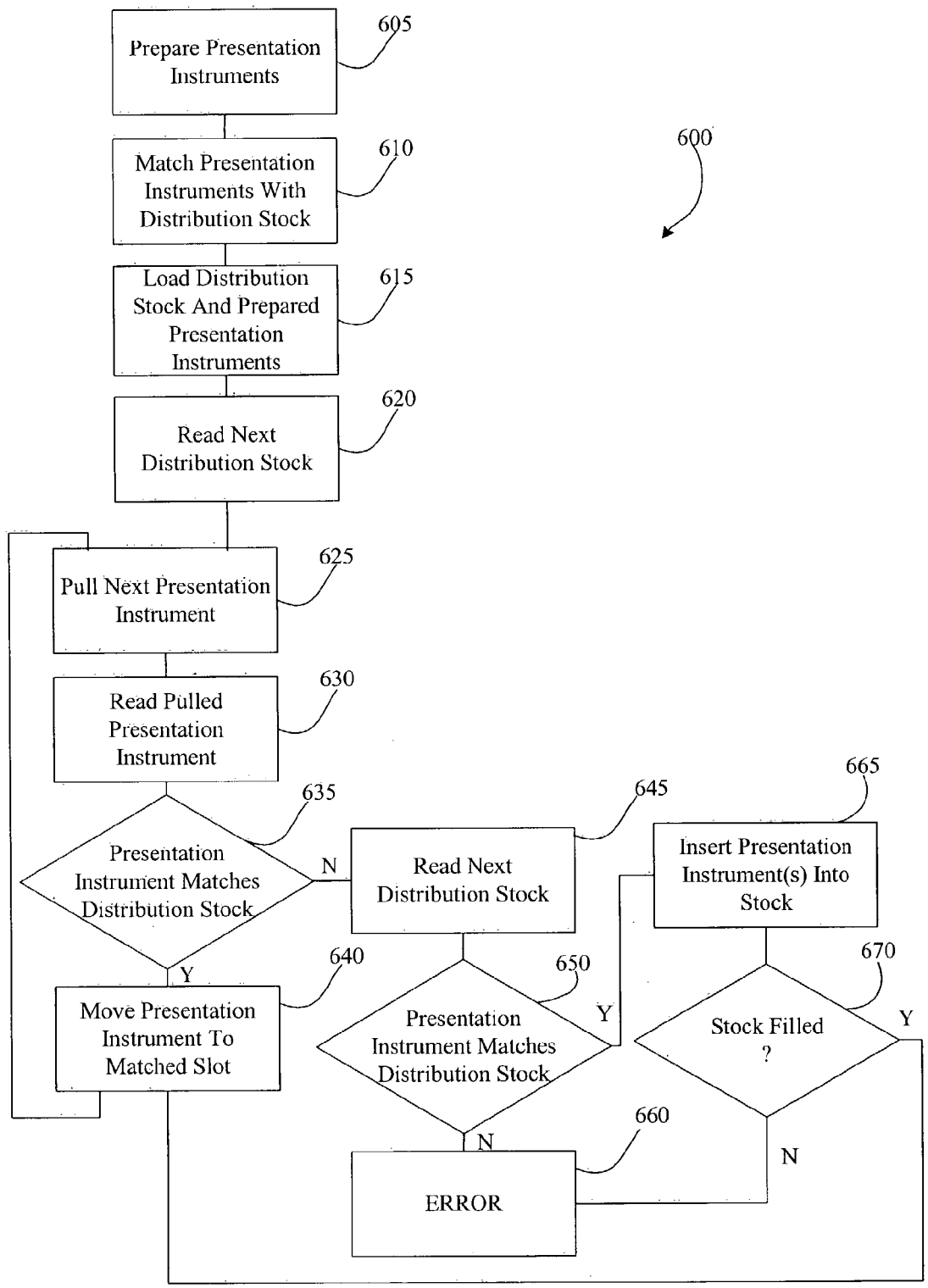
FIG. 6 is a flow diagram of a method in accordance with the present invention for processing presentation instruments.

Referring to FIG. 6, a flow diagram 600 illustrates an embodiment of a method in accordance with the present invention. Following flow diagram 600, presentation instruments are prepared (block 605). Preparation of the presentation instruments can include preparing plastic stock for credit cards or other presentation instruments. Further, the plastic stock can be imprinted with various company logos, contact information, and the like. In addition, the plastic stock can be embossed to include credit card numbers, the name of the credit card holder, expiration dates, and the like. Based on the disclosure provided herein, one of ordinary skill in the art will recognize a variety of other steps and/or types of presentation instruments that can be used in relation to the present invention.

The prepared presentation instruments are matched with distribution stock (block 610). Thus, for example, a run of one thousand presentation instruments can be matched with a roll or box of distribution stock that is pre-printed with the names and addresses of the recipients of the presentation instruments. In some embodiments, the prepared presentation instruments include an embossed account number, and the matched distribution stock includes matching account numbers. In other embodiments, the prepared presentation instruments include a code that is distinct from any underlying account number, and the distribution stock includes the account number that can be correlated to the code on the presentation instruments. In yet other embodiments, the prepared presentation instruments include a code that is distinct from any underlying account number, and the distribution stock includes another code that is also distinct from any underlying account number. These codes can be correlated to each other, and/or to an underlying account number.

The matched distribution stock and prepared presentation instruments are loaded into a presentation instrument processing system in accordance with the present invention. Thus, for example, the prepared presentation instruments are loaded into presentation instrument reservoir 370 and the matching distribution stock is loaded into stock reservoir 503 as illustrated in FIG. 5. With the distribution stock thus loaded, the code printed on the first distribution stock is read (block 620). Based on this code, a list correlating the various presentation instruments with specific distribution stock is downloaded from a database. This list can then be used to assure that the proper presentation instruments are being associated with the correct distribution stock.

The next available presentation instrument is pulled out of the presentation instrument reservoir (block 625). A code on the presentation instrument is read (block 630), and using the list correlating presentation instruments to distribution stock, it is determined whether the presentation instrument is to be attached with one of the distribution stock currently positioned under the inserting element (e.g., an available distribution stock that is any of the one or more distribution stock under the inserting element) (block 635). Where the presentation is to be attached with one of the available distribution stock, the presentation instrument is directed to presentation instrument holder 501 positioned above the selected area of attachment on the identified distribution stock (block 640). From this point, the next available presentation instrument is pulled, read, and moved to the proper presentation instrument holder (blocks 625, 630, 640). This process is repeated until all presentation instruments to be attached to the available distribution stock are loaded into the appropriate presentation instrument holder(s). This can involve placing one card in various presentation instrument holders, multiple presentation instruments in one or more presentation instrument holders, and/or leaving one or more of the presentation instrument holders empty. In some embodiments, it is determined that all presentation instruments that are to be associated with the available distribution stock have been loaded into the various presentation instrument holders by accessing the list correlating the presentation instruments to distribution stock. Once all of the presentation instruments have been loaded, the presentation instruments are moved from the presentation instrument holder(s) to the distribution stock using an insertion or adhesion technique. One such insertion technique is described below in relation to FIG. 7.

As discussed in relation to FIG. 7 below, some embodiments of the present invention provide the novel ability to direct multiple presentation instruments to a single presentation instrument holder. From there, the multiple presentation instruments can be attached to the distribution stock at the same location thereby saving surface area on the distribution stock Alternatively, in other embodiments such as that illustrated in FIG. 6, the trigger for attaching the presentation instruments to the distribution stock is finding a presentation instrument that is not to be inserted in the available distribution stock (block 635). In such a case, the next distribution stock is read (block 645), and it is determined if the presentation instrument matches the next available distribution stock (e.g., any of the one or more distribution stock that will be under the inserter next) (block 650). Where the presentation instrument does not match the next available distribution stock, it is determined that a presentation instrument has been fed into the processing system improperly and an error is asserted (block 660). As such, the processing system can be halted allowing an operator to immediately deal with the spurious presentation instrument. This is advantageous as it avoids requiring an operator to sort through many inserted presentation instruments to find where an error occurred.

Alternatively, where the presentation instrument does match the next distribution stock, the presentation instruments that were previously loaded into presentation instrument holder(s) are attached to the distribution stock (block 665). The list correlating the presentation instruments with the distribution stock is then accessed to determine if all presentation instruments that were to be associated with the available distribution stock are accounted for and have been attached to the distribution stock (block 670). Where it is found that one or more presentation instruments are not accounted for or have not been attached, an error is indicated (bock 660). Again, such an error can cause the processing system to halt, thus allowing an operator to correct any problem without requiring the operator to sort through many presentation instruments already attached to distribution stock.

Where it is determined that the available distribution stock has been fully populated with the desired presentation instruments (block 670), the distribution stock is then advanced through the folding element where it is separated from other distribution stock and folded into a letter sized package and sorted for mailing. As the distribution stock is advanced, the next available distribution stock is positioned under the inserter element. In addition, the presentation instrument that has already been identified as being associated with the next available distribution stock (block 650) is moved to the proper presentation instrument holder in preparation for its eventual attachment to the next available distribution stock (block 640). From here, the process of identifying presentation instrument(s) to be associated with the next available distribution stock is performed 9 blocks 625-660).

Figure 7:
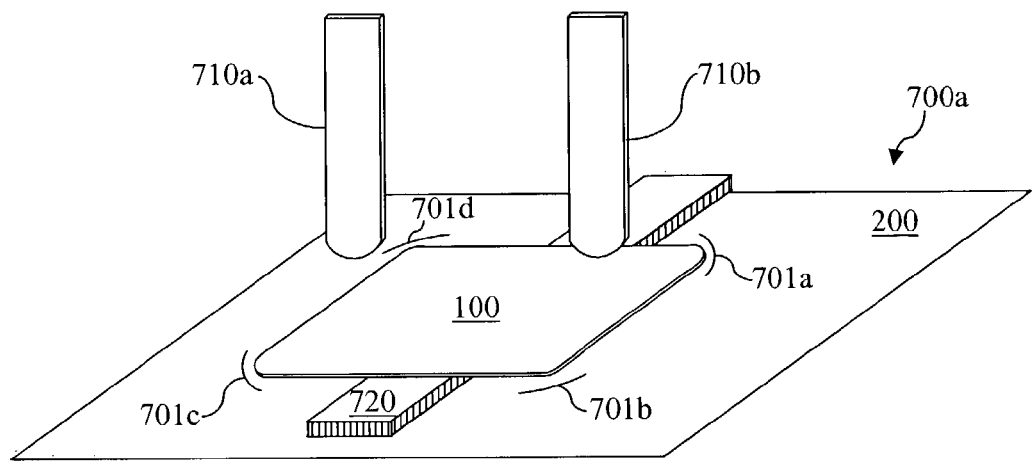
FIG. 7 illustrates a prior art process for attaching a single presentation instrument to a distribution stock.
Figure 7:
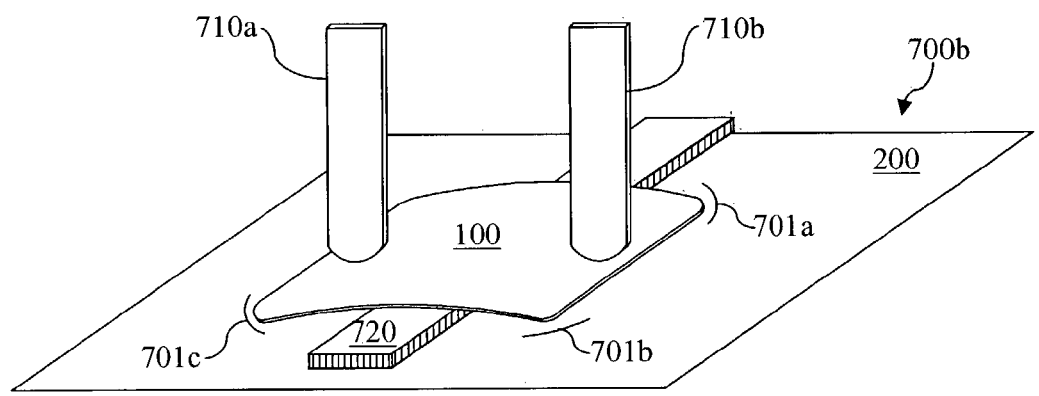
Figure 7:
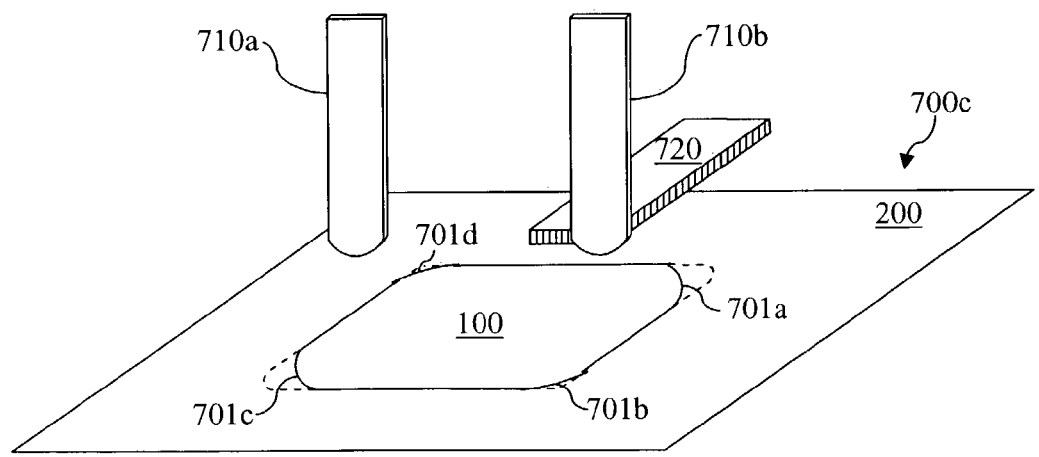

Referring to FIG. 7, mechanical diagrams 700 show steps involved in inserting presentation instrument 100 into slots 701 of distribution stock 200. As illustrated, FIG. 7 depicts a prior art process. However, it should be noted that the process whereby multiple cards are bent together and inserted into a common set of slots is novel to the present invention and is not to be considered prior art. As illustrated in diagram 700a, a support element is disposed under presentation instrument 100, and two bending elements are disposed on either side of and above presentation instrument 100. As previously discussed, in accordance with novel embodiments of the present invention, two or more presentation instruments can be similarly aligned atop each other.

As illustrated in diagram 700b, bending elements 710 are moved relative to support element 720 such that the edges of presentation instrument 100 are bent downward. Again, in novel aspects of the present invention, multiple presentation instruments are simultaneously bent. Then, with presentation instrument 100, bending elements 710 and support element 720 are moved into proximity with distribution stock 200 (or distribution stock 200 is moved into proximity with presentation instrument 100). As illustrated in diagram 700c, bending elements 710 are moved in relation to support element 720 and presentation instrument 100 elastically reforms such that the edges of presentation instrument 100 remain under slots 701 as support element is withdrawn. Presentation instrument 100 remains thus attached to distribution stock 200. Again, where the novel approach of bending multiple presentation instruments 100 simultaneously is utilized, the multiple presentation instruments are simultaneously attached to distribution stock 200.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for preparing presentation instruments for distribution, the method comprising:
reading a code from a distribution stock;
based on the code, accessing a database and determining a presentation instrument to be associated with the distribution stock;
selecting the presentation instrument; and
physically associating the presentation instrument with the distribution stock by attaching the presentation instrument to the distribution stock;
wherein a code associated with the presentation instrument is distinct from a code associated with the distribution stock.

2. The method of claim 1, wherein the distribution stock includes a slot, and wherein attaching the presentation instrument to the distribution stock includes inserting the presentation instrument in the slot.

3. The method of claim 2, wherein inserting the presentation instrument comprises:
bending the presentation instrument;
after bending, placing the presentation instrument in contact with the distribution stock; and
unbending the presentation instrument, wherein at least a portion of the presentation instrument is within the slot.

4. The method of claim 1, wherein attaching the presentation instrument to the distribution stock comprises:
applying an adhesive material; and
bringing the presentation instrument into contact with the distribution stock, wherein the adhesive material is between the presentation instrument and the distribution stock.

5. The method of claim 1, the method further comprising:
folding the distribution stock into a letter sized form.

6. The method of claim 1, wherein selecting the presentation instrument comprises:
pulling the presentation instrument from a holding bin;
moving the presentation instrument to a reader; and
reading a code associated with the presentation instrument.

7. The method of claim 6, wherein selecting the presentation instrument further comprises receiving a misread indication;
moving the presentation instrument to the reader; and
re-reading the code associated with the presentation instrument.

8. The method of claim 1, wherein the presentation instrument is a first presentation instrument, the method further comprising:
determining a second presentation instrument to be associated with the distribution stock;
selecting the second presentation instrument; and
physically associating the second presentation instrument with the distribution stock by attaching the second presentation instrument to the distribution stock.

9. The method of claim 8, wherein attaching the first and the second presentation instruments to the distribution stock comprises:
applying an adhesive material;
bringing the first presentation instrument into contact with the distribution stock, wherein the adhesive material is between the first presentation instrument and the distribution stock at a first location; and
bringing the second presentation instrument into contact with the distribution stock, wherein the adhesive material is between the second presentation instrument and the distribution stock at a second location.

10. The method of claim 8, wherein the distribution stock includes a first and a second slot, and wherein attaching the first and second presentation instruments to the distribution stock includes inserting the first presentation instrument into the first slot, and the second presentation instrument into the second slot.

11. The method of claim 10, wherein inserting the first presentation instrument into the first slot, and the second presentation instrument into the second slot comprises:
moving the first presentation instrument to a first holding port;
moving the second presentation instrument to a second holding port;
bending both the first and the second presentation instruments;
placing the first and the second presentation instruments in contact with the distribution stock; and
unbending the first and the second presentation instruments, wherein at least a portion of the first presentation instrument is within the first slot and at least a portion of the second presentation instrument is within the second slot.

12. The method of claim 1, wherein the presentation instrument is a first presentation instrument, and wherein the distribution stock is a first distribution stock, the method further comprising:

determining a second presentation instrument to be associated with the second distribution stock;
selecting the second presentation instrument; and
simultaneous with attaching the first presentation instrument to the first distribution stock, attaching the second presentation instrument to the second distribution stock.

13. The method of claim 1 wherein the code associated with the distribution stock is an account number associated with an end user.

14. The method of claim 13, wherein the code associated with the presentation instrument is a credit card number associated with the end user, and wherein the credit card number is distinct from the account number.

15. The method of claim 1, wherein accessing the database and determining a presentation instrument to be associated with the distribution stock comprises:
providing the code associated with the distribution stock; and
receiving a code associated with the presentation instrument to be associated with the distribution stock.

16. The method of claim 1, wherein the distribution stock is one of a plurality of distribution stock, and wherein accessing the database and determining a presentation instrument to be associated with the distribution stock comprises:
providing the code associated with the distribution stock; and
receiving a series of codes associated with a plurality of presentation instruments to be associated with the plurality of distribution stock, wherein preparing the plurality of presentation instruments for distribution is accomplished with a single access to the database.

17. The method of claim 16, wherein the order of the plurality of distribution stock is maintained in the database, and wherein the series of codes associated with the plurality of presentation instruments is ordered to match the order of the plurality of distribution stock.

18. The method of claim 17, wherein presentation instruments are associated with at least two of the plurality of distribution stock simultaneously, and wherein the codes associated with the presentation instruments to be associated with the at least two of the plurality of distribution stock can be received in any order.

19. The method of claim 1, wherein the presentation instrument is selected from the group consisting of a credit card, a debit card, a check guarantee card, an identification card, a driver's license, a membership card, an ATM card, and a stored value card.

20. The method of claim 1, wherein the presentation instrument carries an indicia associated with a financial account.

21. A method for preparing presentation instruments for distribution, the method comprising:
reading a code from a distribution stock;
based on the code, accessing a database and determining a presentation instrument to be associated with the distribution stock;
selecting the presentation instrument; and
physically associating the presentation instrument with the distribution stock by attaching the presentation instrument to the distribution stock;
wherein the presentation instrument is a first presentation instrument, the method further comprising:
determining a second presentation instrument to be associated with the distribution stock;
selecting the second presentation instrument; and
physically associating the second presentation instrument with the distribution stock by attaching the second presentation instrument to the distribution stock;
and wherein a code associated with the first presentation instrument is distinct from a code associated with the second presentation instrument.

22. A method for preparing presentation instruments for distribution, the method comprising:
reading a code from a distribution stock;
based on the code, accessing a database and determining a presentation instrument to be associated with the distribution stock;
selecting the presentation instrument; and
physically associating the presentation instrument with the distribution stock by attaching the presentation instrument to the distribution stock;
wherein the presentation instrument is a first presentation instrument, the method further comprising:
determining a second presentation instrument to be associated with the distribution stock;
selecting the second presentation instrument; and
physically associating the second presentation instrument with the distribution stock by attaching the second presentation instrument to the distribution stock;
and wherein the distribution stock includes a slot, and wherein attaching the first and second presentation instruments to the distribution stock includes inserting both the first and the second presentation instruments into the slot.

23. The method of claim 22, wherein inserting both the first and second distribution instruments into the slot comprises:
moving the first presentation instrument to a holding port;
moving the second presentation instrument to the holding port;
bending both the first and the second presentation instruments in the holding port;
placing the first and the second presentation instruments in contact with the distribution stock; and
unbending the first and the second presentation instruments, wherein at least a portion of the first presentation instrument and a portion of the second presentation instrument is within the slot.

24. A method for preparing presentation instruments for distribution, the method comprising:
reading a code from a distribution stock;
based on the code, accessing a database and determining a presentation instrument to be associated with the distribution stock;
selecting the presentation instrument;
physically associating the presentation instrument with the distribution stock by attaching the presentation instrument to the distribution stock; and
blowing the distribution stock into a stackable orientation.

* * * * *